US 6,572,712 B2

(12) United States Patent
Powell et al.

(10) Patent No.: US 6,572,712 B2
(45) Date of Patent: Jun. 3, 2003

(54) COMPACTED GRAPHITE IRON BRAKE DRUM

(75) Inventors: William L. Powell, Waupaca, WI (US); Paul D. Levering, Cullman, AL (US)

(73) Assignees: Waupaca Foundry, Inc., Waupaca, WI (US); Webb Wheel Products, Inc., Cullman, AL (US)

( * ) Notice: Subject to any disclaimer, the term of this patent is extended or adjusted under 35 U.S.C. 154(b) by 0 days.

(21) Appl. No.: 09/737,172

(22) Filed: Dec. 14, 2000

(65) Prior Publication Data

US 2002/0108823 A1 Aug. 15, 2002

(51) Int. Cl.[7] .................. C22C 37/00; C22C 37/04; C22C 37/10
(52) U.S. Cl. .................. 148/321; 420/13; 188/251 A
(58) Field of Search .................. 188/218 XL, 251 K, 188/251 A, 251 M; 420/13; 148/321

(56) References Cited

U.S. PATENT DOCUMENTS

| 3,120,882 A | 2/1964 | Maloney |
| 4,173,681 A | 11/1979 | Durrien et al. |
| 4,175,070 A | 11/1979 | Klein et al. |
| 4,243,574 A | 1/1981 | Manwiller |
| 4,401,469 A | 8/1983 | Rehder |
| 4,420,441 A | 12/1983 | Singer |
| 4,432,922 A | 2/1984 | Kaufman et al. |
| 4,501,612 A | 2/1985 | Stefanescu et al. |
| 4,700,823 A | 10/1987 | Winckler |
| 4,767,278 A | 8/1988 | Enderlein, Jr. |
| 4,990,194 A | 2/1991 | Obata et al. |
| 5,413,194 A | 5/1995 | Kulis, Jr. et al. |
| 5,603,784 A | 2/1997 | Bay |
| 5,858,127 A | 1/1999 | Ott et al. |
| 5,888,645 A | 3/1999 | Lindgaard et al. |
| 6,053,990 A | 4/2000 | Persson et al. |

FOREIGN PATENT DOCUMENTS

| GB | 2 079 315 A | | 1/1982 |
| JP | 56-9354 | | 1/1981 |
| JP | 57-54246 | | 3/1982 |
| JP | 60-247036 | * | 12/1985 |
| JP | 61-143554 | * | 7/1986 |
| JP | 9-111393 | * | 4/1997 |
| JP | 10-68042 | * | 3/1998 |
| WO | WO 99 19525 A | | 4/1999 |

OTHER PUBLICATIONS

"CG Iron Makes a Dramatic Improvement in the Performance of Railroad Disc Brakes", Castings, vol. 28, No. 7/8, Jul.–Aug. 1982, pp. 12–13.
"Mechanical Properties of Compacted Graphite Iron", http://www.castingsource.com/tech_art_graphite.asp.

* cited by examiner

Primary Examiner—Deborah Yee
(74) Attorney, Agent, or Firm—Harness, Dickey & Pierce, P.L.C.

(57) ABSTRACT

A compacted graphite iron brake component for use in a braking system having a final composition of: 3.0 to about 4.0 percent carbon; 2.15 to about 2.60 percent silicon; 0.40 to about 0.90 manganese; and the balance iron. The brake component having a frictionally engageable portion with a microstructure of compacted graphite disposed in a pearlitic matrix.

15 Claims, 2 Drawing Sheets

COMPACTED GRAPHITE IRON BRAKE DRUM

TECHNICAL FIELD

The present invention relates to an improved cast iron material, and particularly to an improved cast iron brake drum having a compacted graphite micro structure disposed within a primarily pearlitic metallurgical structure.

BACKGROUND AND SUMMARY OF THE INVENTION

Brake drums are widely employed in all vehicles having different types of cast iron brake drums. In service, these drums often times encounter strenuous work conditions, and thereby desirably employ materials that will exhibit excellent wear resistance, strength, and heat conductivity. In view of the complexities of the shape, and taking into account other material properties and processes requirements; it has been common to manufacture brake drums with a gray cast iron material.

The use of presently employed casting materials has presented limitations in improving the design of brake drums, especially in reducing part weight. By way of example, the trend has been towards reducing weight by casting gray iron against a steel shell to reduce the weight of the brake drums. These composite brake drums significantly increase production time and costs. Absent additional expensive, time consuming, and potentially inefficient heat treatments or finishing steps, significant volumes of high integrity brake drum castings are often not obtainable over short periods of time.

Accordingly, even though light weight castings are achieved, the manufacturer of high integrity iron brake drums require expensive and substantial time consuming post-casting finishing steps. A system is needed that permits the casting of an integrally shaped article, particularly a brake component, which has excellent machinability, wear resistance, and high strength characteristics, as well as heat transfer characteristics. Additionally, the brake components must also meet all required brake component properties which are required of brake components. The microstructure should include a generally uniform dispersion of compacted forms of graphite (vermicular) in a pearlitic iron matrix.

The present invention satisfies the above by providing an improved system for making a cast iron article, particularly a cast brake component. The gray cast iron brake component for use in a braking system has a final composition of: from about 3.0 to about 4.0 percent carbon; about 2.15 to about 2.60 percent silicon; about 0.40 to about 0.90 manganese; and the balance iron. The compacted graphite iron brake component has a frictionally engageable portion with a microstructure containing compacted graphite disposed in a primarily pearlitic matrix. Other advantages and objects of the present invention will become apparent to those skilled in the art from the subsequent detailed description, the drawings, and appended claims.

BRIEF DESCRIPTION OF THE DRAWINGS

The various advantages of the present invention will become apparent to one skilled in the art by reading the following specification and subjoined claims and by referring to the following drawings in which:

DETAILED DESCRIPTION OF THE PREFERRED EMBODIMENTS

While the material and system of the present invention may be suitable for manufacture of many different articles, for exemplary purposes it will be described herein for the manufacture of a brake component, and/or particularly, a brake drum.

The term "pearlite" (also known as pearlitic iron) shall mean an intimate mixture of ferrite and cementite. In particular, pearlite is a lamellar structure comprised typically of alternating layers of ferrite and cementite. As used herein, the term "ferritic" shall generally refer to a body centered cubic form of iron (also known as ferrite).

Figure 1:
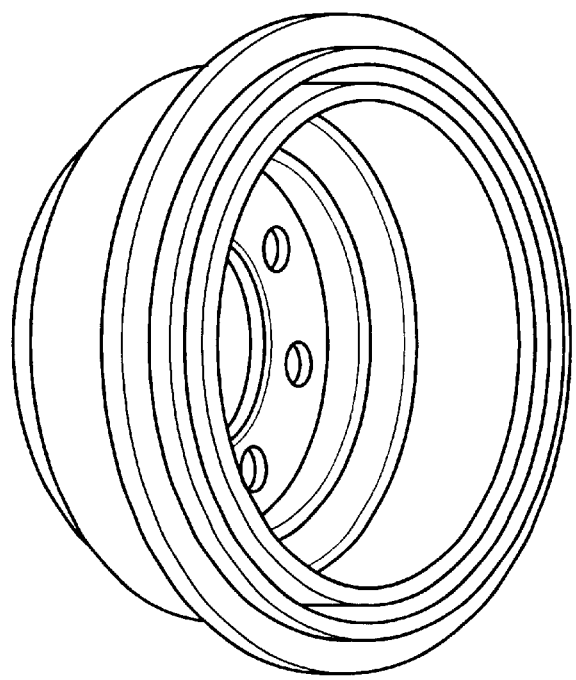
FIG. 1 is a perspective view of a brake drum.
Figure 2:
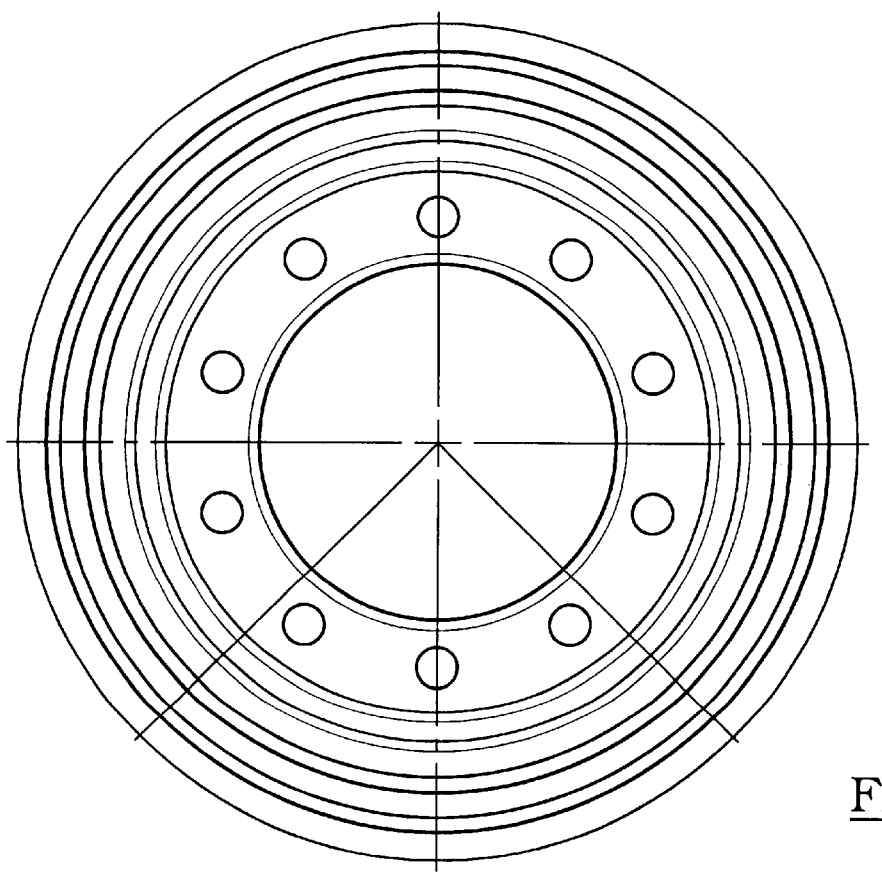
FIG. 2 is a top view of the brake drum from FIG. 1.

For ease of discussion, FIGS. 1 and 2 depict one illustrative example, without limitations, of a typical brake drum that can be employed in a vehicle braking system. These designs shown are cast as integral structures. FIGS. 1 and 2 illustrate views of a typical brake drum structure for a braking system. The function and operation of such a brake drum will be appreciated by the skilled artisan. The brake drum includes a first base portion having a first plate member, a wall depending from the first plate member, and a second plate member.

The skilled artisan will appreciate that FIGS. 1 and 2 are for illustration purposes only (to demonstrate the geometric intricacies of brake drums) and are not intended as limiting. The present invention contemplates its usefulness in many different configurations, other than those in FIGS. 1–2.

The ferrous base metal preferably is of a suitable composition to result, upon casting, in a compacted graphite cast iron. Thus the ferrous base metal preferably includes iron as a base material, carbon, silicon, manganese, magnesium, and alloys in predetermined amounts. Further, the melt is alloyed with a suitable pearlite stabilizer to achieve at least a predetermined amount of pearlite microstructure in the resulting article. These alloying elements can take the form of chromium, copper, tin, and all other pearlite stabilizing elements. Those skilled in the art would recognize that other alloys are available and suitably usable in their respective amounts. Compacted graphite iron is addressed in "Iron Casting Handbook," 1981, pp. 381–397, herein expressly incorporated by reference.

For instance, for a preferred base material:

TABLE 1

| Compacted Graphite Iron Composition | |
|---|---|
| C | 3.30–3.70 |
| Si | 2.15–2.70 |
| Mn | 0.20–0.80 |
| P | 0.01–0.04 |
| S | 0.001–0.020 |
| Cr | 0.01–0.06 |
| Mo | 0.01–0.50 |
| Cu | 0.10–0.90 |
| Ti | 0.01–0.10 |
| Sn | 0.001–0.15 |

The skilled artisan will appreciate that higher or lower contents than the above may be suitably employed.

The production of the present invention involves employment of a process having the steps of:

(a) preparing a melt of a ferrous base metal;
(b) alloying the melt in a suitable pearlite stabilizer to achieve the predetermined microstructure in a resulting article;
(c) providing alloying elements into the ferrous base metal to produce a compacted graphite structure; and
(d) pouring the melt to cast an article.

The ferrous base materials are prepared in any suitable manner. Upon preparation, it is maintained at a temperature of at least about 2600° F. in a suitable furnace.

Figure 3:
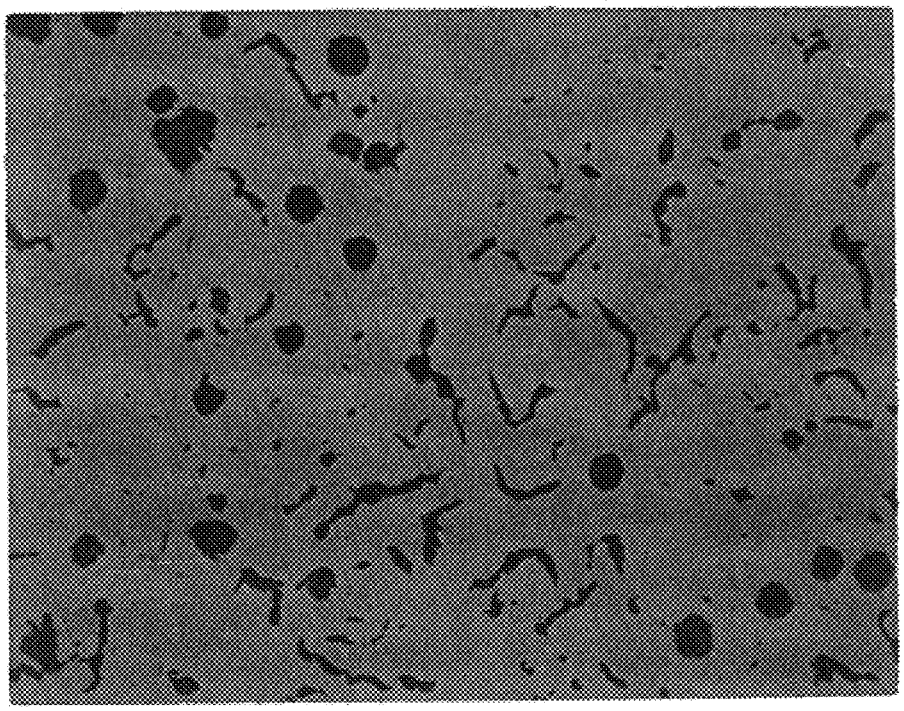
FIG. 3 is a photomicrograph depicting a microstructure of a section (at a magnification of 100×; no etch) of a brake drum of the present invention.
Figure 4:
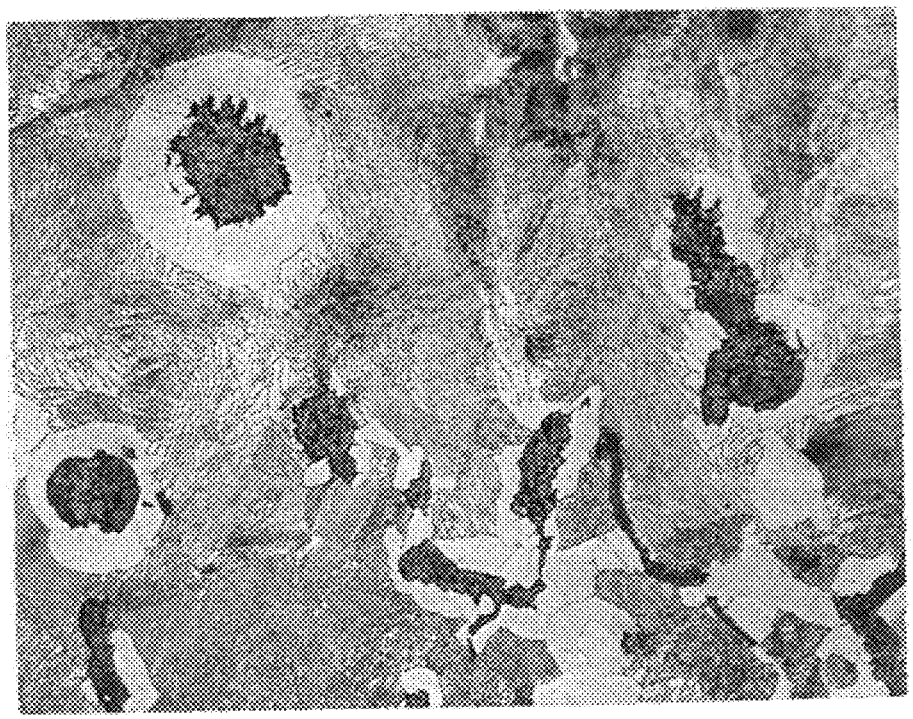
FIG. 4 is a photomicrograph depicting the microstructure of the section of the same portion (at a magnification of 400×; 4% nital etch) as FIG. 3.

The resulting material is a substantially homogenous microstructure of compacted graphite flakes dispersed relatively uniformly through a generally pearlitic to matrix. FIGS. 3 through 4 illustrate the microstructure and show how the graphite (the solid darker phase) is distributed throughout the pearlitic phase (the lighter phase in FIG. 3 and the darker phase in FIG. 4). The microstructures of FIGS. 3 and 4 extend through substantially the entire component (regardless of type), including the regions substantially adjacent the surface of the drum.

The amount of graphite present as a compacted structure in the present alloy should not exceed about 50% by volume. The preferred amount of graphite as compacted flakes is typically in the range of from about 0.05 to 20% by volume. The presence of graphite as flakes in amounts of up to 2% by volume of graphite present reduces the strength of the alloy. The compacted graphite iron is described in ASTM A-842-85 as a grade 300, 350, or 400.

Magnesium is alloyed with the base iron to produce a final magnesium content or 0.005–0.02 percent magnesium. A plurality of treatment processes exist to produce compacted graphite iron all of which also produce ductile iron. The treated iron is inoculated to reduce metallic carbides at a minimal level of inoculate additions. Ferrosilicon and derivatives of ferrosilicon inoculates are most often employed. The alloy has a microstructure of 50% to 100% pearlitic matrix. Most preferably, the microstructure is 65–85% pearlitic matrix.

While the above detailed description describes the preferred embodiment of the present invention, it should be understood that the present invention is susceptible to modification, variation, and alteration without deviating from the scope and fair meaning of the subjoined claims.

What is claimed is:

1. A compacted graphite iron brake drum comprising:
   (a) a base portion; and
   (b) a wall defining an interior friction engagement surface adjoining said base portion, said base portion and said friction portion being composed of a material having a final composition comprising:
      (i) carbon in an amount of about 3.0 to about 4.0 weight percent;
      (ii) sulfur in an amount of about 0.001 to about 0.020 weight percent; and
      (iii) the balance primarily iron, said base portion and said friction portion having a microstructure of compacted graphite disposed in a matrix which is greater than 50% pearlitic.

2. The compacted graphite iron brake drum of claim 1 having carbon in an amount from 3.30–3.70 weight percent.

3. The compacted graphite iron brake drum of claim 1 further comprising:
   (iii) silicon in an amount of about 2.15 to about 2.60 weight percent; and
   (iv) manganese in an amount of about 0.40 to about 0.90 weight percent.

4. The compacted graphite iron brake drum of claim 1 having a matrix having from greater than 0 to 50% by volume compacted graphite.

5. The compacted graphite iron brake drum of claim 3 having a matrix having from greater than 0 to 20% by volume compacted graphite.

6. The compacted graphite iron brake drum of claim 1 having from greater than 50% to 70% pearlitic matrix.

7. The compacted graphite iron brake drum of claim 5 having from 65 to 85% pearlitic matrix.

8. The compacted graphite iron brake drum of claim 1 having from greater than 50% to 65% pearlitic matrix.

9. A compacted graphite iron brake drum having compacted graphite dispersed therein, comprising:
   (a) a base portion; and
   (b) a wall depending upon said base portion, said wall defining an interior friction engagement surface wherein said base portion and side wall comprise:
      (i) carbon in an amount of about 3.0 to about 4.0 by weight percent;
      (ii) silicon in an amount of about 2.15 to about 2.60 by weight percent;
      (iii) manganese in an amount of about 0.40 to about 0.90 by weight percent;
      (iv) sulfur in an amount of about 0.001 to about 0.020 by weight; and
   wherein said compacted graphite iron alloy has a matrix which is greater than 50% and less than 70% pearlitic with said compacted graphite disposed therein.

10. The compacted graphite iron brake drum of claim 9 comprising from greater than 50 to 60% by volume pearlitic matrix.

11. The compacted graphite iron brake drum of claim 9 comprising from 65 to 70% by volume pearlitic matrix.

12. The compacted graphite iron brake drum of claim 9 comprising from 3.30–3.70% by weight carbon.

13. The compacted graphite iron brake drum of claim 9 comprising a matrix having from greater than 0 to 50% by volume compacted graphite.

14. The compacted graphite iron brake drum of claim 9 comprising a matrix having from greater than 0 to 20% by volume compacted graphite.

15. The compacted graphite iron brake drum of claim 9 comprising from greater than 50 to 65% by volume compacted graphite.

* * * * *